United States Patent
Cui

(10) Patent No.: US 10,362,101 B2
(45) Date of Patent: *Jul. 23, 2019

(54) MECHANISM FOR PROVIDING LOAD BALANCING TO AN EXTERNAL NODE UTILIZING A CLUSTERED ENVIRONMENT FOR STORAGE MANAGEMENT

(71) Applicant: Nutanix, Inc., San Jose, CA (US)

(72) Inventor: Miao Cui, New York, NY (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,077

(22) Filed: Jul. 3, 2017

(65) Prior Publication Data

US 2017/0302731 A1    Oct. 19, 2017

Related U.S. Application Data

(63) Continuation of application No. 14/276,737, filed on May 13, 2014, now Pat. No. 9,699,251.

(51) Int. Cl.
*G06F 15/173* (2006.01)
*H04L 29/08* (2006.01)
*G06F 9/50* (2006.01)

(52) U.S. Cl.
CPC ........ *H04L 67/1017* (2013.01); *G06F 9/5083* (2013.01)

(58) Field of Classification Search
CPC ................ H04L 67/1097; H04L 47/125; H04L 67/1029
USPC ........................................................ 709/226
See application file for complete search history.

(56) References Cited

U.S. PATENT DOCUMENTS

| | | | |
|---|---|---|---|
| 8,549,518 B1 | 10/2013 | Aron et al. | |
| 8,560,671 B1 * | 10/2013 | Yahalom | H04L 67/1097 709/224 |
| 8,601,473 B1 | 12/2013 | Aron et al. | |
| 8,843,630 B1 | 9/2014 | Thomas et al. | |
| 8,850,130 B1 | 9/2014 | Aron et al. | |

(Continued)

FOREIGN PATENT DOCUMENTS

WO    WO 2002037224 A2    5/2002

OTHER PUBLICATIONS

International Search Report and Written Opinion dated Aug. 20, 2015, for corresponding PCT Patent Application No. PCT/US15/30587, 8 pages.

(Continued)

*Primary Examiner* — Tauqir Hussain
(74) *Attorney, Agent, or Firm* — Vista IP Law Group, LLP

(57) ABSTRACT

A method for providing load balancing to a client node external to a clustered environment for storage management, includes deploying a lightweight load balancing component at the client node, receiving I/O requests issued by virtual machines hosted at the client node by the lightweight load balancing component, performing a hashing algorithm on content of the I/O requests by the lightweight load balancing component to identify one or more controller virtual machines at the clustered environment for handling the I/O requests and dynamically distributing the I/O requests from the lightweight load balancing component to the one or more controller virtual machines at the clustered environment for storage management.

21 Claims, 16 Drawing Sheets

(56) References Cited

U.S. PATENT DOCUMENTS

| | | | |
|---|---|---|---|
| 9,772,866 | B1 | 9/2017 | Aron et al. |
| 2002/0133491 | A1 | 9/2002 | Sim et al. |
| 2004/0078467 | A1 | 4/2004 | Grosner et al. |
| 2008/0281967 | A1 | 11/2008 | Muhlestein et al. |
| 2009/0113420 | A1* | 4/2009 | Pawlowski .......... G06F 9/5083 718/1 |
| 2009/0204961 | A1 | 8/2009 | Dehaan et al. |
| 2009/0222583 | A1* | 9/2009 | Josefsberg .......... H04L 67/1002 709/245 |
| 2013/0204995 | A1 | 8/2013 | Fu et al. |
| 2014/0258446 | A1 | 9/2014 | Bursell |
| 2015/0089034 | A1 | 3/2015 | Stickle et al. |
| 2015/0215308 | A1 | 7/2015 | Manolov et al. |

OTHER PUBLICATIONS

Non-Final Office Action dated Sep. 1, 2016 for related U.S. Appl. No. 14/276,737.

Notice of Allowance and Fee(s) Due dated Mar. 1, 2017 for related U.S. Appl. No. 14/276,737.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (9 Jun. 2016), from https://nutanixbible.comt.

Poitras, Steven. "The Nutanix Bible" (3 Jan. 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

MECHANISM FOR PROVIDING LOAD BALANCING TO AN EXTERNAL NODE UTILIZING A CLUSTERED ENVIRONMENT FOR STORAGE MANAGEMENT

CROSS REFERENCE TO RELATED APPLICATIONS

The present application is a continuation application of U.S. application Ser. No. 14/276,737, filed on May 13, 2014, entitled "MECHANISM FOR PROVIDING LOAD BALANCING TO AN EXTERNAL NODE UTILIZING A CLUSTERED ENVIRONMENT FOR STORAGE MANAGEMENT", which is hereby incorporated by reference in their entirety.

The present application is related to U.S. Pat. No. 8,601,473, issued on Dec. 3, 2013, entitled "ARCHITECTURE FOR MANAGING I/O AND STORAGE FOR A VIRTUALIZATION ENVIRONMENT", which is all hereby incorporated by reference in their entirety.

FIELD

This disclosure concerns a mechanism for providing load balancing to an external node utilizing a clustered environment for storage management.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

A node (e.g., server) hosting one or more virtual machines may utilize storage devices and storage management functionality that is external to the node. Typically this involves associating the one or more virtual machines at the node with an external networked storage environment having a set of storage controllers that communicate with a set of networked storage appliances via a network such as a Fiber Channel or Ethernet network. Thereafter, I/O requests (e.g., write requests or read requests) from the virtual machines at the node are provided to a storage controller at the external networked storage environment that fulfills the I/O requests and manages the data associated with I/O requests for the virtual machines.

In providing storage management functionality to the virtual machines, a dedicated storage controller at the external networked storage environment is assigned to all of the virtual machines at the node. All I/O requests pass through the dedicated storage controller before being fulfilled. Because all I/O requests from VMs in the node pass through single dedicated storage controller at the external networked storage environment, an excessive load may be incurred by the dedicated storage controller. Even where the dedicated storage controller is able to distribute a portion of its load to other storage controllers in the external networked storage environment, this is done so only after the dedicated storage controller has already received the I/O requests.

SUMMARY

Embodiments of the present invention provide a mechanism for providing load balancing to an external node utilizing a clustered environment for storage management.

Further details of aspects, objects and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Figure 1:
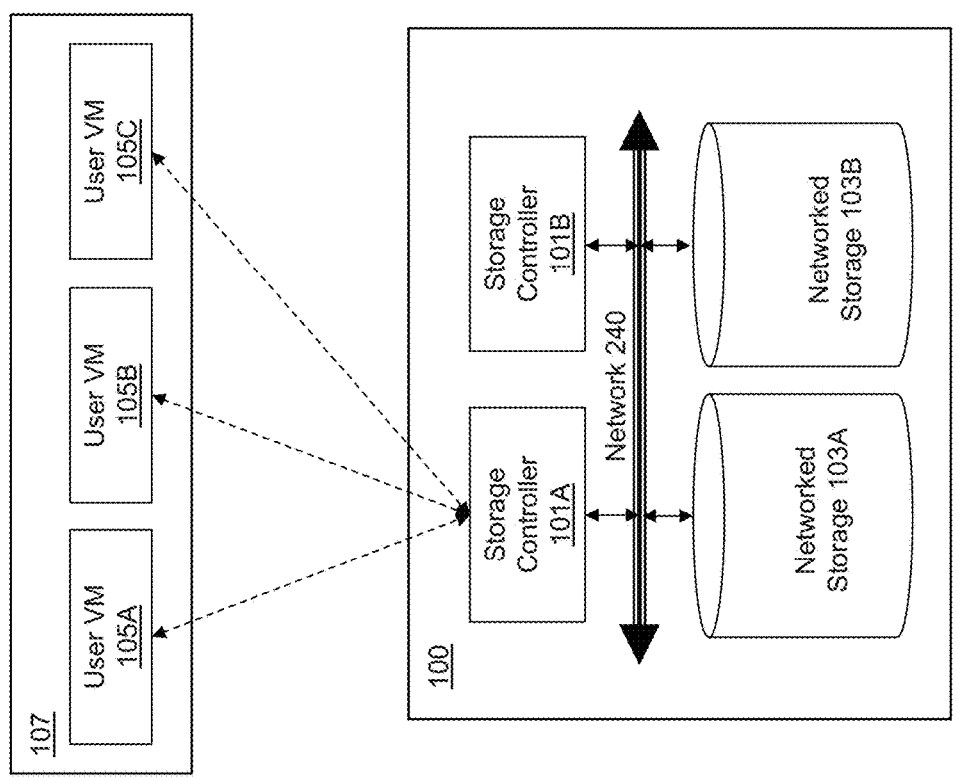
FIG. 1 illustrates a system for providing storage management functionality to a node hosting virtual machines.

FIG. 1 illustrates a system for providing storage management functionality to a node hosting virtual machines. For purposes of example, the node 107 hosting virtual machines 105A, 105B, 105C will be referred to as a client node. For purposes of illustration, the client node 107 only depicts the virtual machines 105A, 105B, 105C that are running in its virtualized environment. However, one ordinarily skilled in the art will recognize that the client node 107 includes a set of physical resources (not shown) that are virtualized or transformed into the underlying support for the virtual machines 105A, 105B, 105C using a hypervisor (not shown) such that the virtual machines 105A, 105B, 105C can run their own operating systems and applications on the underlying physical resources just like a real computer.

While the client node 107 may have its own set of physical storage (not shown), the virtual machines 105A, 105B, 105C residing at the client node 107 may instead utilize a networked storage environment 100 external to the client node 107 for storage management functionality. The external networked storage environment 100 includes a set of storage controllers 101A, 101B that communicate with a set of networked storage appliances 103A, 103B via a network 140 such as a Fiber Channel or Ethernet network. The networked storage appliances 103A may include any various networked storage appliances including cloud storage devices and storage area networks (SAN).

In providing storage management functionality to the virtual machines 105A, 105B, 105C of the client node 107, a dedicated storage controller 101A at the external networked storage environment 100 is statically assigned to all of the virtual machines 105A, 105B, 105C at the client node 107. All I/O requests initiated by VMs 105A, 105B, 105C in the client node 107 pass through the dedicated storage controller 101A before being fulfilled. Because all I/O requests initiated by VMs 105A, 105B, 105C in the client node 107 pass through the single dedicated storage controller 101A at the external networked storage environment 100 prior to being fulfilled, an excessive load may be incurred by the dedicated storage controller 101A in fulfilling I/O requests and providing storage management functionality to the VMs 105A, 105B, 105C at the client node 107. Even where the dedicated storage controller 101A is able to subsequently distribute a portion of its load to other storage controllers 101B in the external networked storage environment 100, this is done so only after the dedicated storage controller 101A has already received the I/O requests.

Figure 2:
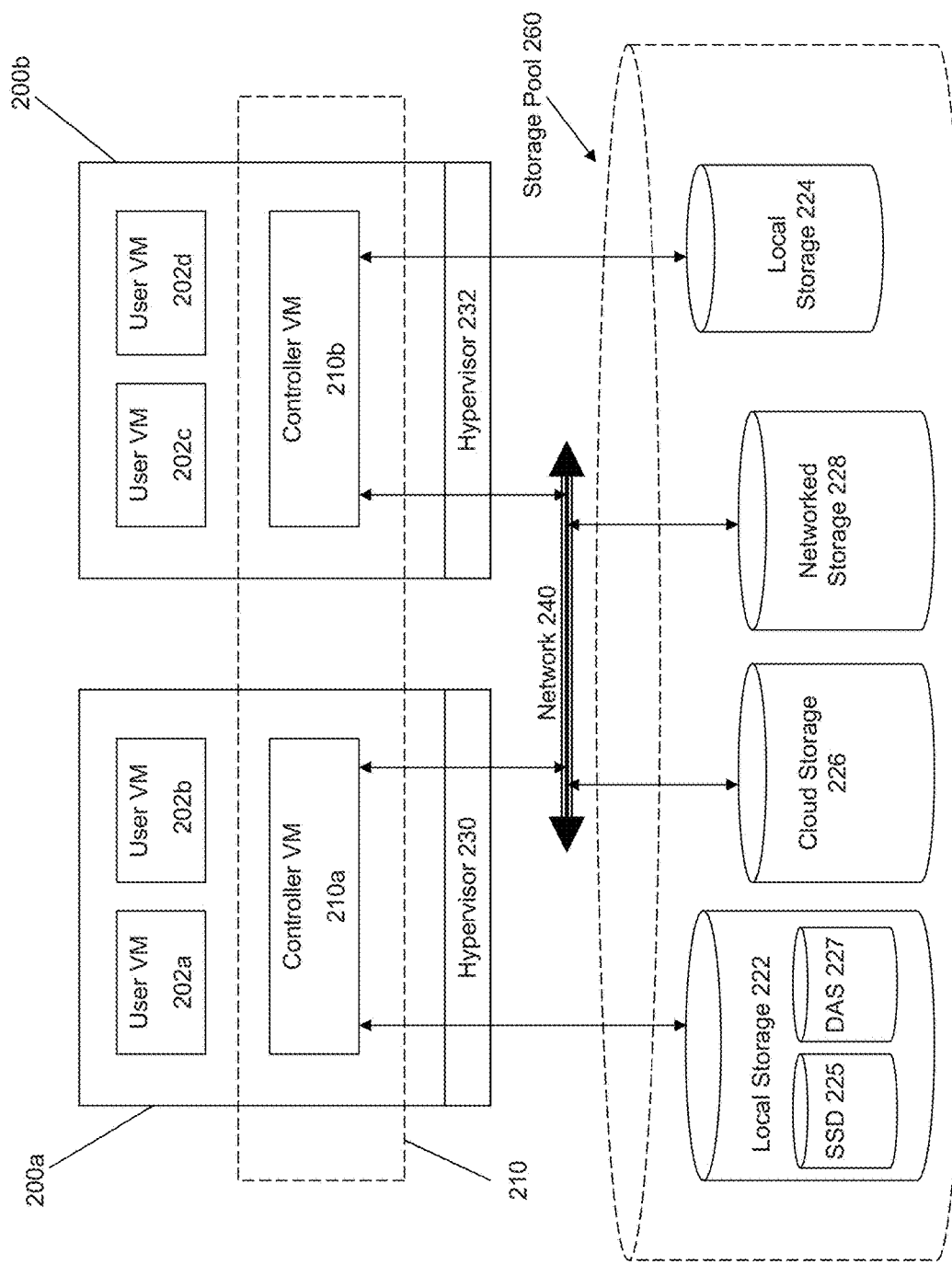
FIG. 2 illustrates an architecture for implementing storage management in a virtualization environment according to some embodiments of the invention.

FIG. 2 illustrates an architecture for implementing storage management in a virtualization environment according to some embodiments of the invention.

The architecture of FIG. 1 can be implemented for a distributed platform that contains multiple servers/nodes 200a and 200b that manages multiple tiers of storage. The multiple tiers of storage include storage that is accessible through a network 240, such as cloud storage 226 or networked storage 228 (e.g., a SAN or "storage area network"). Unlike the prior art, the present embodiment also permits local storage 222/224 that is within or directly attached to the server/node and/or appliance to be managed as part of the storage pool 260. Examples of such storage include Solid State Drives (henceforth "SSDs") 225 or Hard Disk Drives (henceforth "HDDs" or "spindle drives") 227. These collected storage devices, both local and networked, form a storage pool 260. Virtual disks (or "vDisks") can be structured from the storage devices in the storage pool 260, as described in more detail below. As used herein, the term vDisk refers to the storage abstraction that is exposed by a controller VM to be used by a user VM. In som embodiments, the vDisk is exposed via iSCSI ("internet small computer interface") or NFS ("network file system") and is mounted as a virtual disk on the user VM.

Each node 200a or 200b runs virtualization software, such as VMware ESX (i), Microsoft Hyper-V, or RedHat KVM. The virtualization software includes a hypervisor 230/232 to manage the interactions between the underlying hardware and the one or more user VMs 202a, 202b, 202c and 202d that run client software.

A special VM 210a/210b is used to manage storage and I/O activities according to some embodiments of the invention, which is referred to herein as a "Service VM" or "Controller VM". This is the "Storage Controller" in the currently described architecture. Multiple such storage controllers coordinate within a cluster to form a single system. The Controller VMs 210a/210b are not formed as part of specific implementations of hypervisors 230/232. Instead, the Controller VMs run as virtual machines above hypervisors 230/232 on the various nodes 202a and 202b, and work together to form a distributed system 210 that manages all of the storage resources, including the locally attached storage 222/224, the networked storage 228, and the cloud storage 226. Since the Controller VMs run above the hypervisors 230/232, this means that the current approach can be used and implemented within any virtual machine architecture, since the Controller VMs of embodiments of the invention can be used in conjunction with any hypervisor from any virtualization vendor.

Each Controller VM 210a-b exports one or more block devices or NFS server targets that appear as disks to the client VMs 202a-d. These disks are virtual, since they are implemented by the software running inside the Controller VMs 210a-b. Thus, to the user VMs 202a-d, the Controller VMs 200a-b appear to be exporting a clustered storage appliance that contains some disks. All user data (including the operating system) in the client VMs 202a-d resides on these virtual disks.

Significant performance advantages can be gained by allowing the virtualization system to access and utilize local (e.g., node-internal) storage 222 as disclosed herein. This is because I/O performance is typically much faster when performing access to local storage 222 as compared to performing access to networked storage 228 across a network 240. This faster performance for locally attached storage 222 can be increased even further by using certain types of optimized local storage devices, such as SSDs 225.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 222. On the other hand, data that does not require fast access or which is accessed infrequently can be stored in the networked storage device 228 or in cloud storage 226.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 210a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QoS) functions, encryption, and compression. The new architecture massively parallelizes storage, by placing a storage controller—in the form of a Controller VM—at each hypervisor, and thus makes it possible to render enough CPU and memory resources to achieve the aforementioned optimization.

Additional details regarding networked virtualization environments for storage management are described in issued U.S. Pat. No. 8,601,473, issued on Dec. 3, 2013, entitled "Architecture for Managing I/O and Storage for a Virtualization Environment", which is hereby incorporated by reference in its entirety.

The architecture illustrated in FIG. 2 may also be referred to as a clustered environment for storage management and will be referred to herein as a clustered environment for storage management. Although not illustrated or described above, the clustered environment for storage management of FIG. 2 may additionally be utilized to provide storage management functionality to virtual machines residing at a client node external to the clustered storage environment. In these situations, the clustered environment for storage management acts as a storage server to the virtual machines residing at the client node.

In order to improve storage management functionality provided by the clustered environment to the virtual machines residing at the client node, load balancing and other optimizations related to the distribution of I/O requests issued by those virtual machines may be performed at the client node. One advantage of performing load balancing at the client node is that multiple controller VMs residing at the clustered environment may be used to service I/O requests issued by VMs at the client node. This is in contrast to the approach where a dedicated storage controller at the networked storage environment is statically assigned for handling I/O requests issued by VMs at the client node.

In order to provide client side initiated load balancing for I/O requests issued by VMs at the client node, a virtual machine or process configured to perform optimizations related to the distribution of those I/O requests may be deployed at the client node. Such a virtual machine or process will be referred to herein as a "Controller VM Lite".

Figure 3:
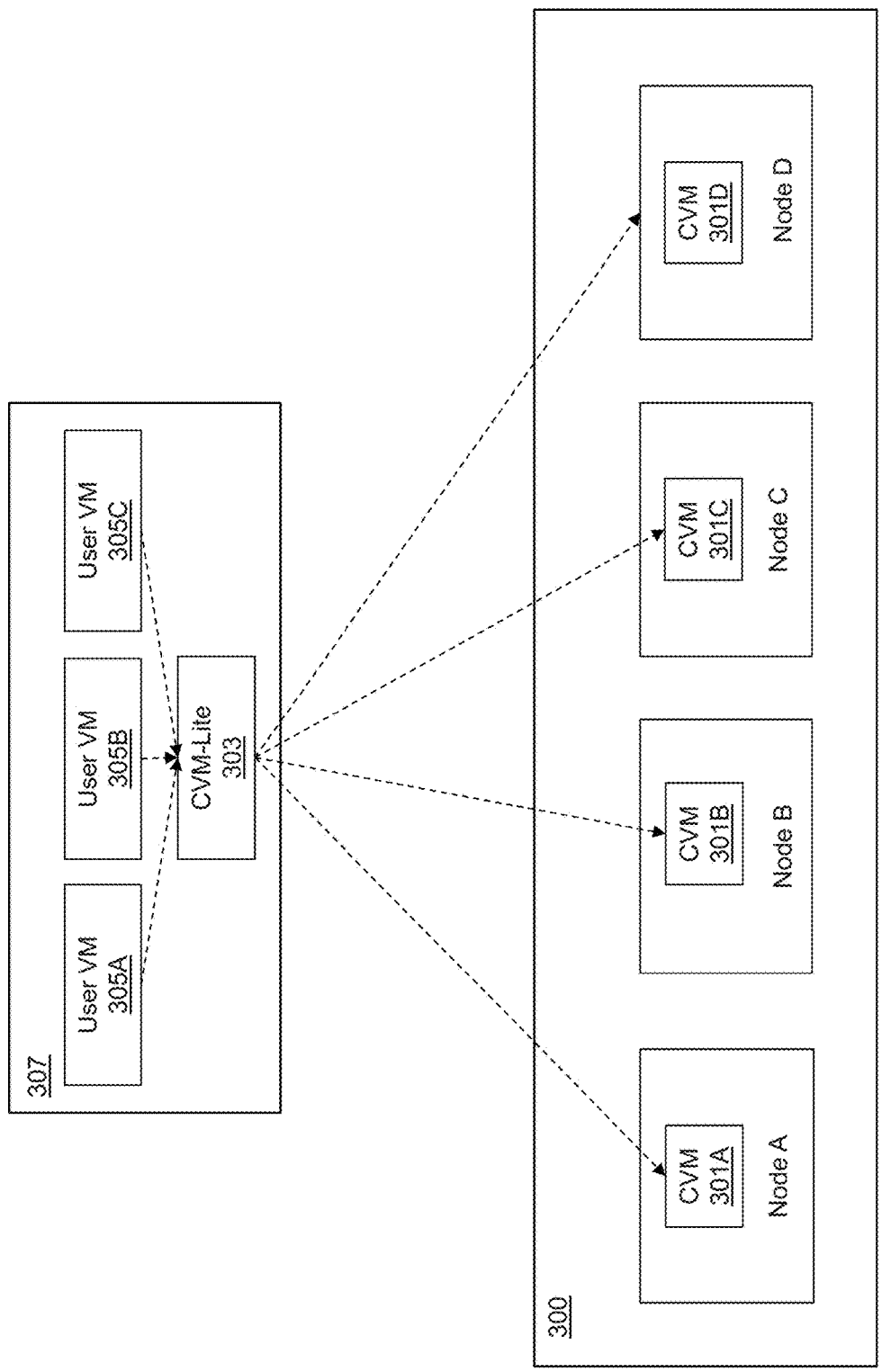
FIG. 3 illustrates a controller VM lite deployed at a client node that utilizes a clustered environment for storage management in accordance with some embodiments of this invention.

FIG. 3 illustrates a controller VM lite deployed at a client node that utilizes a clustered environment for storage management in accordance with some embodiments of this invention. The controller VM lite provides client side load balancing and other optimizations related to distribution of I/O requests issued by VMs at the client node.

FIG. 3 depicts a client node 307 hosting virtual machines 305A-C that utilizes a clustered environment for storage management 300. The client node 307 is external to the clustered environment 300 and virtual machines 305A-C hosted by the client node 307 issue I/O requests that are handled by clustered environment 300.

The clustered environment for storage management 300 depicted in FIG. 3 is substantially similar to the clustered environment for storage management described in FIG. 2, and as such will not be described again in detail. For purposes of simplicity, only nodes A, B, C and D of the clustered environment for storage management 300 and their corresponding controller VMs 301A-D will be illustrated. However, it is important to note that the clustered environment for storage management 300 includes all of the additional features described above in FIG. 2. For example, each node A-D of the clustered environment may include various user virtual machines that are serviced by the controller VM 301A-D residing at that node. Additionally, each node A-D may include a set of local storage devices and the clustered environment 300 may include a set of networked storage devices that are shared amongst the nodes A-D.

For purposes of illustration, the client node 307 only depicts the virtual machines 305A, 305B, 305C that are running in its virtualized environment. However, one ordinarily skilled in the art will recognize that the client node 307 includes a set of physical resources (not shown) that are virtualized or transformed into the underlying support for the virtual machines 305A, 305B, 305C using a hypervisor (not shown) such that the virtual machines 305A, 305B, 305C can run their own operating systems and applications on the underlying physical resources just like a real computer.

A virtual machine or process referred to as a Controller VM Lite 303, or otherwise referred to herein as a lightweight load balancing component is deployed at the client node 307. The Controller VM lite 303 provides the VMs 305A-C residing at the client node 307 with a portion of the functionality of the Controller VMs 301A-D residing at the clustered environment for storage management 300. Such functionality includes load balancing and other optimizations related to distribution of client-side VM issued I/O requests.

I/O requests issued by VMs 305A-C residing at the client node 307 are first passed to the controller VM lite 303, which then distributes the I/O requests to corresponding controller VMs 301A-D residing at the clustered environment for storage management 300. To the user VMs 305A-C residing at the client node 307, the controller VM Lite 303 appears to be a networked storage server with a corresponding IP address. Thus, I/O requests issued by the user VMs 305A-C at the client node 307 can address the controller VM lite 303 through its associated IP address.

The Controller VM lite 303 distributes the I/O requests to controller VMs 301A-D residing at the clustered environment for storage management 300 in a manner such that the I/O requests being handled by the controller VMs 301A-D at the clustered environment are load balanced. Additionally, the controller VM lite 303 distributes the I/O requests in a manner such that I/O requests directed at related pieces of data may be distributed to the same controller VM 301A-D where possible. This will be described in additional detail below.

Providing a Controller VM lite 303 at the client node 307 allows for multiple controller VMs 301A-D residing at the clustered environment for storage management 300 to be initially assigned to I/O requests issued by the VMs 305A-C at the client node 307 rather than statically assigning a dedicated controller VM for handling all I/O requests issued by the VMs 305A-C at the client node 307. Additionally, I/O requests issued by VMs 305A-C at the client node 307 may be distributed to controller VMs 301A-D at the cluster 300 in manner that accounts for load balancing prior to passing those I/O requests to the controller VMs 301A-D. In this way storage management functionality may be provided to the VMs 305A-C at the client node 307, without incurring excessive loads at a single controller VM 301A-D of the cluster 300.

Figure 4:
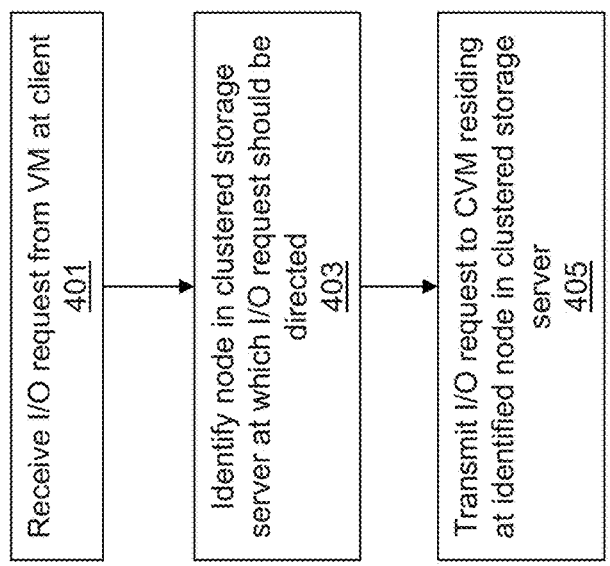
FIG. 4 is a flow diagram illustrating a method for distributing I/O requests issued by VMs residing at a client node to clustered environment for storage management in accordance with some embodiments.

FIG. 4 is a flow diagram illustrating a method for distributing I/O requests issued by VMs residing at a client node to clustered environment for storage management in accordance with some embodiments. The method for distributing I/O requests issued by VMs residing at the client node to the clustered environment for storage management is practiced by the controller VM lite deployed at the client node.

Initially, the controller VM lite receives an I/O request issued by a virtual machine residing at the client node as shown at 401. As mentioned above, the controller VM lite appears to be a networked storage server with a corresponding IP address to virtual machines at the client node. In some embodiments, the virtual machines residing at the client node may issue I/O requests to the controller VM lite in the form of NFS requests. The term "NFS" or "Network File System" interface refers to an IP-based file access standard in which NFS clients send file-based requests to NFS servers via a proxy folder (directory) called "mount point".

The I/O request received by the controller VM lite will eventually be passed to the clustered storage environment, where it will be handled. However, before passing the I/O request to the clustered storage environment, the controller VM lite will first perform certain optimizations (including load balancing) related to the distribution of that I/O request to the clustered environment for storage management.

Initially, the controller VM lite will perform a hashing algorithm on the content of the I/O request to identify a node and corresponding controller VM for handling the I/O request. In some embodiments, the hashing algorithm is performed on the file handle or header of the I/O request, and the hashing algorithm will identify a controller VM for handling the I/O request. I/O requests directed at the same vDisk location will result in the same controller VM initially being identified for handling the I/O requests.

However, it is not always the case that the identified controller VM will be used to handle the I/O request. This may be due to the identified controller VM having a very large current load or the identified controller VM being in an unhealthy state. Thus, other criteria may also be utilized by the controller VM lite in determining which controller VM in the clustered environment the I/O request should be transmitted to, which will be described in greater detail below.

To facilitate optimizations related to distribution of I/O requests issued by VMs at the client node, the controller VM lite may be in communication with the controller VMs residing at the clustered environment. The controller VM lite may identify the state of the clustered environment through its communication with the controller VMs at the clustered environment. The state of the clustered environment may include such information as the number of active controller VMs in the clustered environment, the current load of the active controller VMs in the clustered environment, and the health statuses for the active controller VMs in the clustered environment.

Additionally, the controller VM lite may also maintain metadata related to client side VM issued I/O requests, such as which controller VMs at the clustered environment previously handled I/O requests for which VMs at the client node and where data associated with previous I/O requests are located in the clustered environment.

Using the hashing algorithm as well as the information related to the state of the clustered environment and other metadata related to client side VM issued I/O requests, the controller VM lite may identify which node in the clustered environment to direct the received I/O request to as shown at 403. Additional details pertaining to the identification of which node in the clustered environment to direct I/O requests will be described below.

Once a node within the clustered environment has been identified for directing the client VM issued I/O requests, the I/O request is passed to the controller VM residing at the identified node as shown at 405. Upon receiving the I/O request from the controller VM lite at the client node, the controller VM residing at the identified node in the clustered environment fulfills the I/O request.

Figure 5:
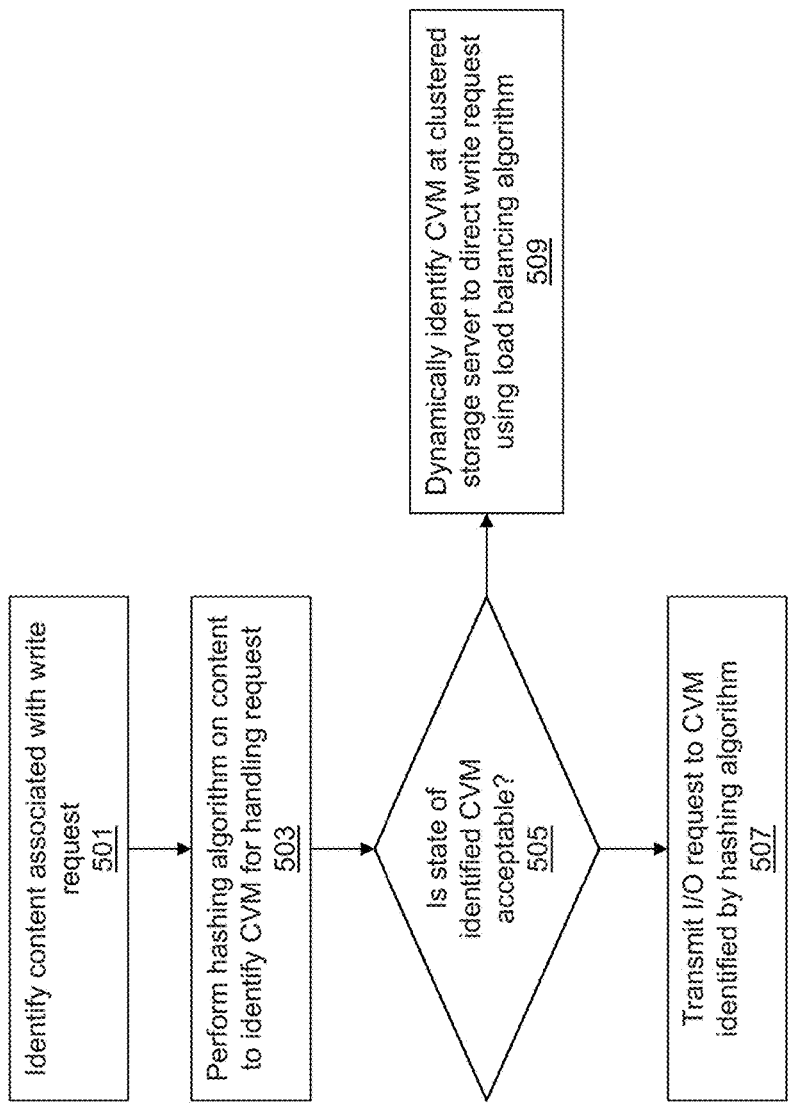
FIG. 5 is a flow diagram illustrating a method for identifying which node in the clustered environment to direct a received write request according to some embodiments of the invention.

FIG. 5 is a flow diagram illustrating a method for identifying which node in the clustered environment to direct a received I/O request. The method described in FIG. 5 may be used to identify which node in the clustered environment to direct a write request issued by a VM at the client node. A different method may be used to identify which node in the clustered environment to direct a read request issued by a VM at the client node, which will be described in detail below. The write request may be a request to write new data or may alternatively be a write request to modify data previously written.

Initially, a content associated with the write request may be identified as shown at 501. The content may be a file handle of the write request. The file handle may identify the vDisk at which the write request is deircted and may be a vDisk that has already been created to handle storage management for the VM issuing the I/O request or may alternatively be a new vDisk that is to be created for handling storage management for the VM issuing the I/O request. When the vDisk is one that has already been created for handling storage management for the VM issuing the write request, a node (and its corresponding controller VM) at the clustered environment may already be assigned to handle management of that vDisk. When the vDisk is one that is to be created for handling storage management for the VM issuing the write request, a node (and corresponding controller VM) at the clustered environment may not yet be assigned to handle management of that vDisk.

A hashing algorithm is then performed on the content (e.g., file handle) of the I/O request to identify a CVM for handling the I/O request as shown at 503. I/O requests directed to the same vDisk location will result in the same CVM being initially identified by the hashing algorithm.

A determination of the acceptability of the state of the identified CVM is then made by the controller VM lite as shown at 505. The acceptability of the state of the identified CVM may be based on its health status and current load.

For example, if the identified CVM is in good health and has a manageable current load, then the CVM lite may determine that the identified CVM should be assigned for handling the I/O request as shown at 507. The controller VM lite may utilize the metadata related to client side VM issued I/O requests to make such a determination. This may result in more optimal storage management for the client side VM because the same CVM is utilized for providing storage management functionality to the client side VM, rather than having many different CVMs providing storage management functionality to the client side VM.

If however, the CVM lite determines that the identified CVM is in an unacceptable state (e.g., heavy load or poor health), then the CVM lite will dynamically identify another CMV in the clustered environment to direct the write request using a load balancing algorithm as shown at 509. The controller VM lite may utilize the metadata related to client side VM issued I/O requests to make such a determination.

In some embodiments, the controller VM lite may utilize the state of the clustered environment to identify a node and corresponding CVM at the clustered environment to direct the write request. The state of the clustered environment may be determined by the controller VM lite through its communication with the controller VMs at the clustered environment. The controller VM lite may recognize the current load of the active controller VMs in the clustered environment, and select an active controller VM in the clustered environment with a smaller load to direct to the write request. Additionally, the controller VM lite may take into account the health status of CVMs in the clustered environment and only assign the write request to a CVM that is in good health.

Where multiple CVMs at the clustered environment are in good health and have manageable loads, the controller VM lite may utilize a load balancing algorithm to determine which node and corresponding CVM at the clustered environment to direct the write request. For example, the load balancing algorithm may implement round robin distribution of write requests. When round robin distribution of write requests is implemented, a first write request or first set of write requests are directed to a first node in the clustered environment, a second write request or second set of write requests are directed to a second node in the clustered environment, and so on. Once a first group of write requests have been directed to every node in the clustered environment in this manner, the cycle repeats, and a subsequent write request or set of write requests is again directed to the first node in the clustered environment.

Whenever a node in the clustered environment fails or is otherwise removed, the load balancing algorithm implemented by the controller VM lite may simply skip over that node when distributing write requests issued by VMs at the client node. When a node in the clustered environment recovers from failure or is otherwise added, the load balancing algorithm implemented by the controller VM lite may then account for that node when distributing write requests issued by VMs at the client node.

The load balancing algorithm may also be modified to support weighted distribution of write requests. When weighted distribution of write request is implemented, nodes within the clustered environment are assigned weights based on their ability to service write requests. For example, a node in the clustered environment having a greater capacity for servicing write requests may be assigned a greater weight and a node in the clustered environment having a lesser capacity for servicing write requests may be assigned a lower weight. In this way, a greater percentage of write requests issued by VMs in the client node may be distributed to nodes in the clustered environment having a greater capacity and a lesser percentage of write requests issued by VMs in the client node may be distributed to nodes in the clustered environment having a lesser capacity.

Figure 6:
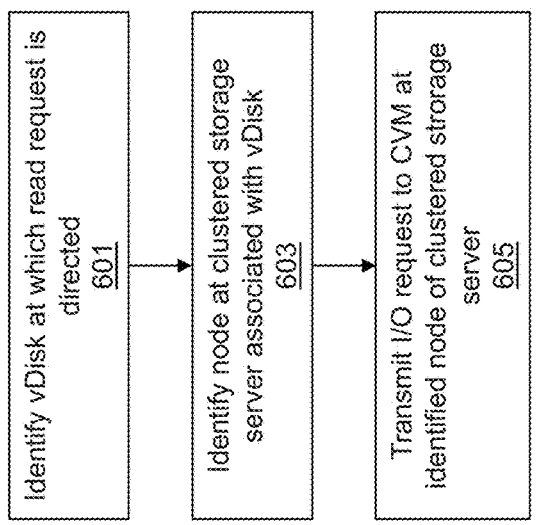
FIG. 6 is a flow diagram illustrating a method for identifying which node in the clustered environment to direct a received read request according to some embodiments of the invention.

In addition to handling the distribution of write requests issued by VMs at the client node, the controller VM lite may also be utilized to handle distribution of read requests issued by VMs at the client node. FIG. 6 is a flow diagram illustrating a method for identifying which node in the clustered environment to direct a received read request according to some embodiments of the invention.

Initially, a vDisk at which the read request is directed to may be identified as shown at 601. Because the I/O request received by the controller VM lite is a read request rather than a write request, the vDisk is necessarily a vDisk that has already been created to handle storage management for the VM issuing the read request. As such, a node (and its corresponding controller VM) at the clustered environment is already be assigned to handle management of that vDisk.

The controller VM lite may then identify the node at the clustered environment that is associated with the vDisk as shown at 603. In some embodiments, the controller VM lite may make this determination by accessing its metadata to identify which node in the clustered environment was previously servicing I/O requests for the client side VM currently issuing the read request. In such situations, the node in the clustered environment that was previously servicing I/O requests for the client side VM may be identified for servicing the current read request. This may result in more optimal storage management for the client side VM because the same node is utilized for providing storage management functionality to the client side VM, rather than having many different nodes providing storage management functionality to the client side VM.

In other embodiments, the controller VM lite may perform a hashing algorithm on the content (e.g., file handle) of the read request to identify the node at the clustered environment that is associated with the vDisk.

After the node at the clustered environment is identified for directing the client side VM issued read request, the read request is transmitted by the controller VM lite to the controller VM residing at the identified node as shown at 605.

Thus, by deploying a controller VM lite at the client node to facilitate distribution of I/O requests issued by VMs at the client node, multiple controller VMs residing at the clustered environment for storage management may be assigned to I/O requests issued by the VMs at the client node rather than statically assigning a dedicated controller VM for handling all I/O requests issued by the VMs at the client node. Additionally, I/O requests issued by VMs at the client node may be distributed to controller VMs at the cluster in a manner that accounts for load balancing prior to passing those I/O requests to the controller VMs. In this way storage management functionality may be provided to the VMs at the client node, without incurring excessive loads at a single controller VM 301A-D of the cluster. Another advantage resulting from the deployment of the controller VM lite is that I/O requests issued by VMs at the client node may be distributed such that I/O requests directed at related pieces of data may be distributed to the same controller VM 301 where possible.

FIGS. 7A-I are schematic diagrams illustrating an example of I/O request distribution performed by a controller VM lite deployed at a client node that utilizes a clustered environment for storage management according to some embodiments of the invention. The client node 307, controller VM lite 303, and clustered environment for storage management 300 depicted in FIGS. 7A-H are substantially similar to those depicted in FIG. 3 and as such will not be described again in detail.

Figure 7A:
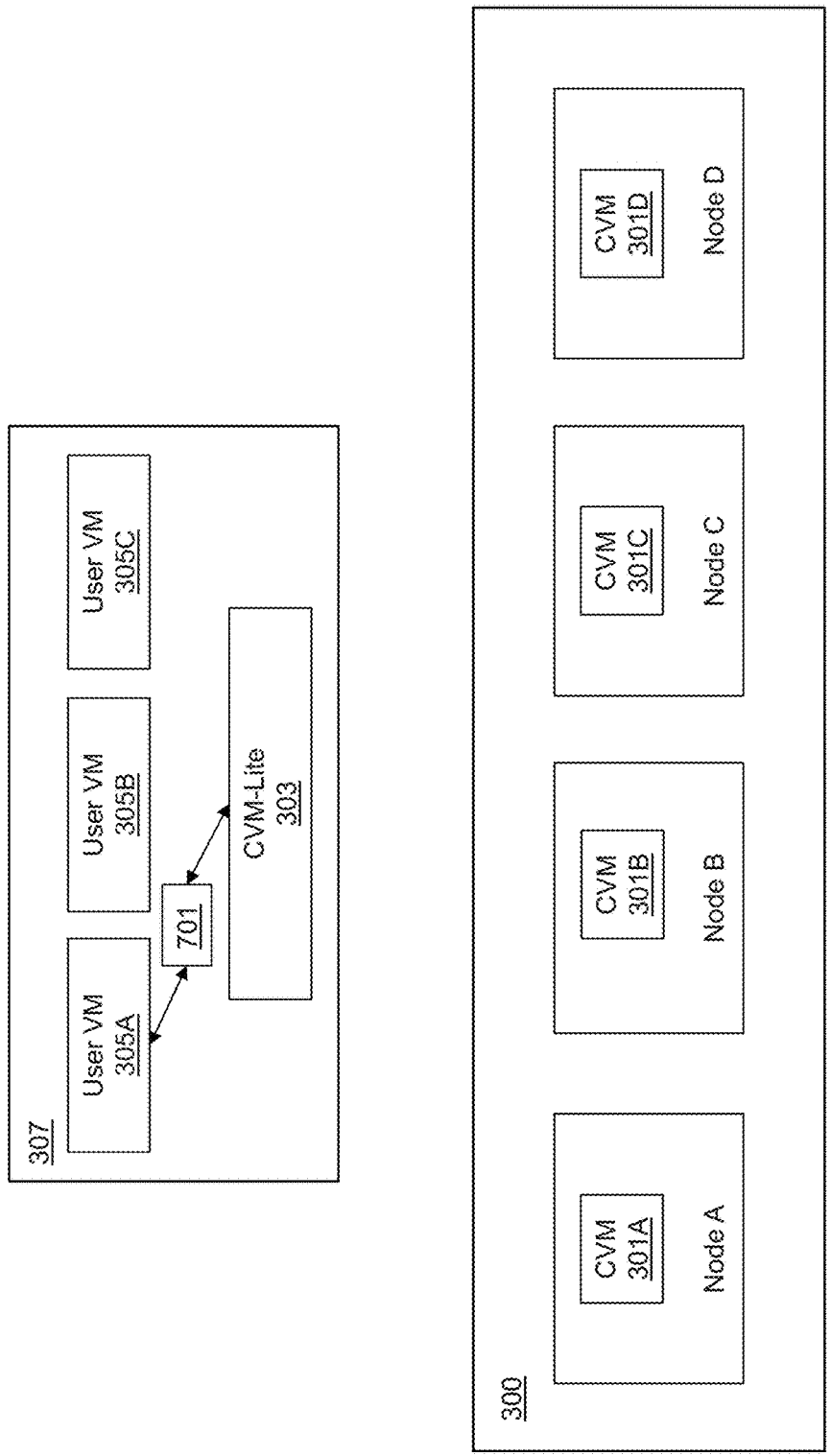
FIGS. 7A-I are schematic diagrams illustrating an example of I/O request distribution performed by a controller VM lite deployed at a client node that utilizes a clustered environment for storage management according to some embodiments of the invention.

In FIG. 7A, VM 305A of the client node 307 issues a write request 701. The controller VM lite 303 receives the write request 701 issued by VM 305A residing at the client node 307. The controller VM lite 303 appears to be a networked storage server with a corresponding IP address to VMs 305A-C at the client node 307. The write request 701 issued by VM 305A to the controller VM lite 303 may be issued in the form of an NFS request.

The write request 701 received by the controller VM lite 303 will eventually be passed to the clustered storage environment 300, where it will be handled. However, before passing the write request 701 to the clustered storage environment 300, the controller VM lite 303 will first perform certain optimizations (including load balancing) related to the distribution of that write request 701 to the clustered environment 300.

Initially, a vDisk at which the write request 701 is directed to may be identified. For purposes of example, it will be assumed that the vDisk at which the write request 701 is directed is a new vDisk that is to be created for handling storage management for the VM issuing the I/O request. Because the vDisk is one that is to be created for handling storage management for the VM issuing the write request, a node (and corresponding controller VM) at the clustered environment 300 is not yet assigned to handle management of that vDisk. The controller VM lite 303 may thus dynamically identify a node A-D at the clustered environment 300 to direct the write request 700.

For purposes of example, it will be assumed that the controller VM lite 303 utilizes a load balancing algorithm to determine which node A-D at the clustered environment 300 to direct the write request 701. The load balancing algorithm implements round robin distribution of write requests, where each successive write request is distributed to a different node A-D in the clustered environment 300.

Figure 7B:
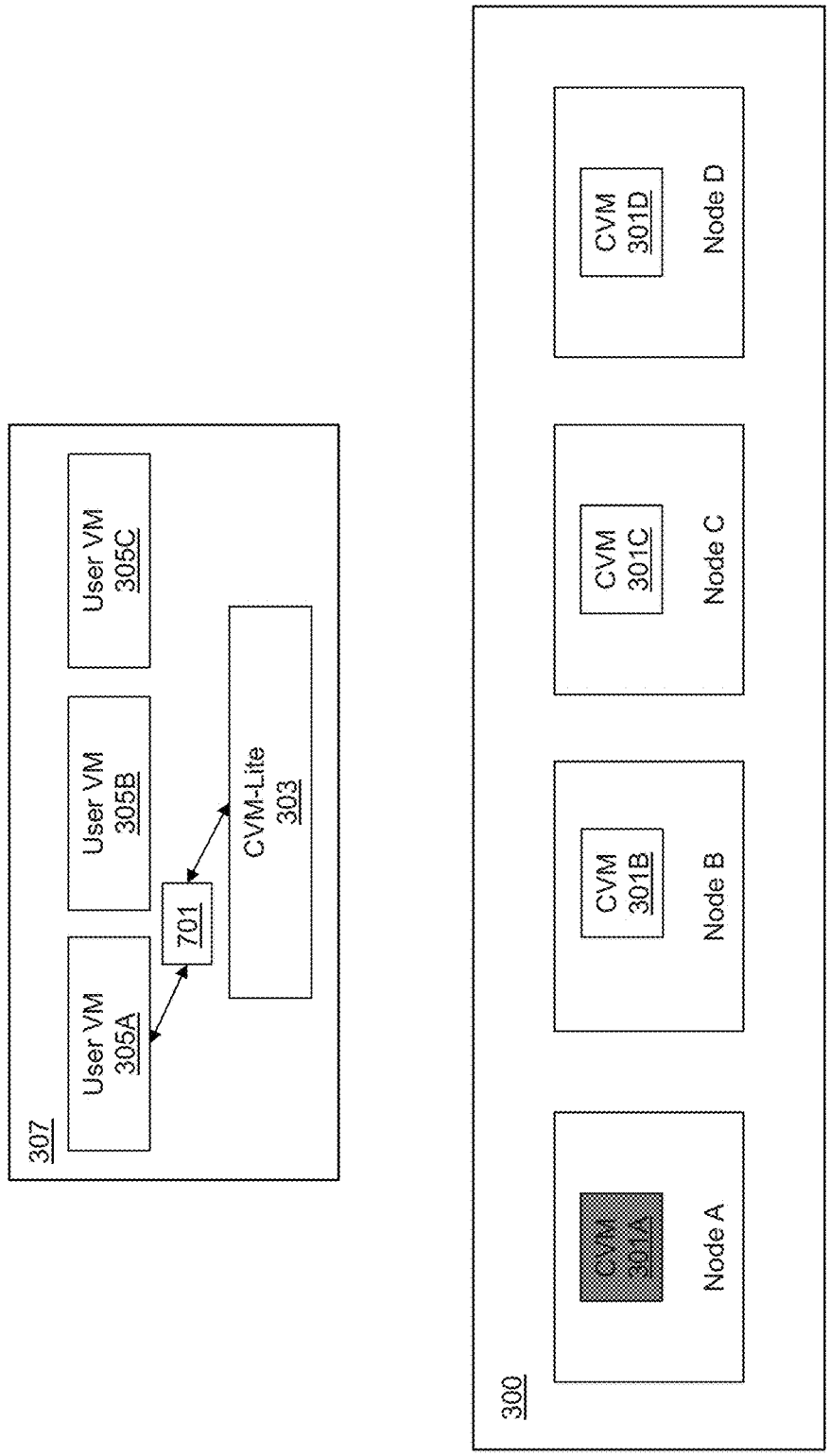
Figure 7C:
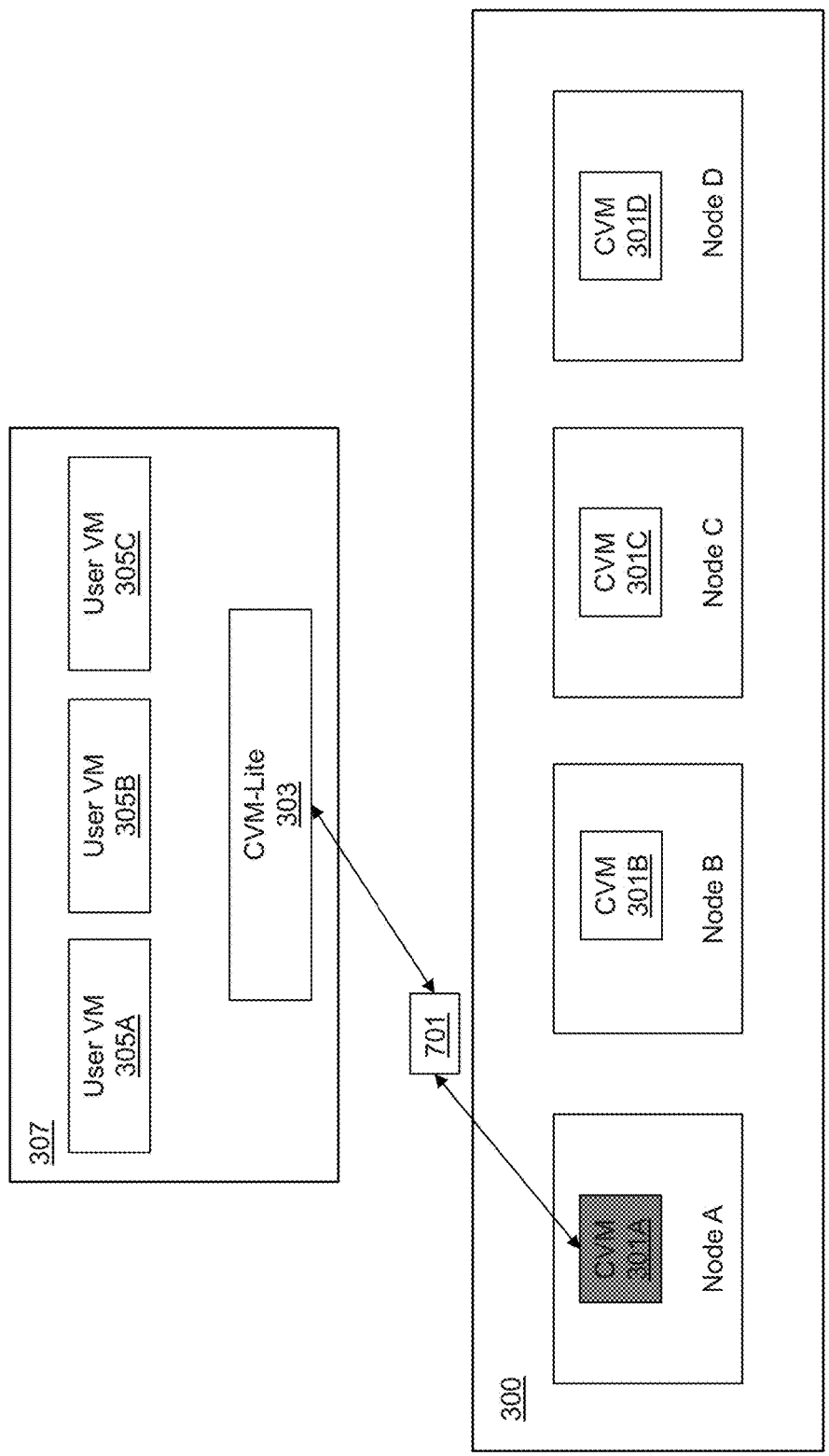

Here, node A in the clustered environment 300 is identified for directing the write request 701 as illustrated in FIG. 7B. Once node A has been identified for directing the write request 701, the write request 701 is directed to the controller VM 301A corresponding to node A in the clustered environment 300 as illustrated in FIG. 7C.

Figure 7D:
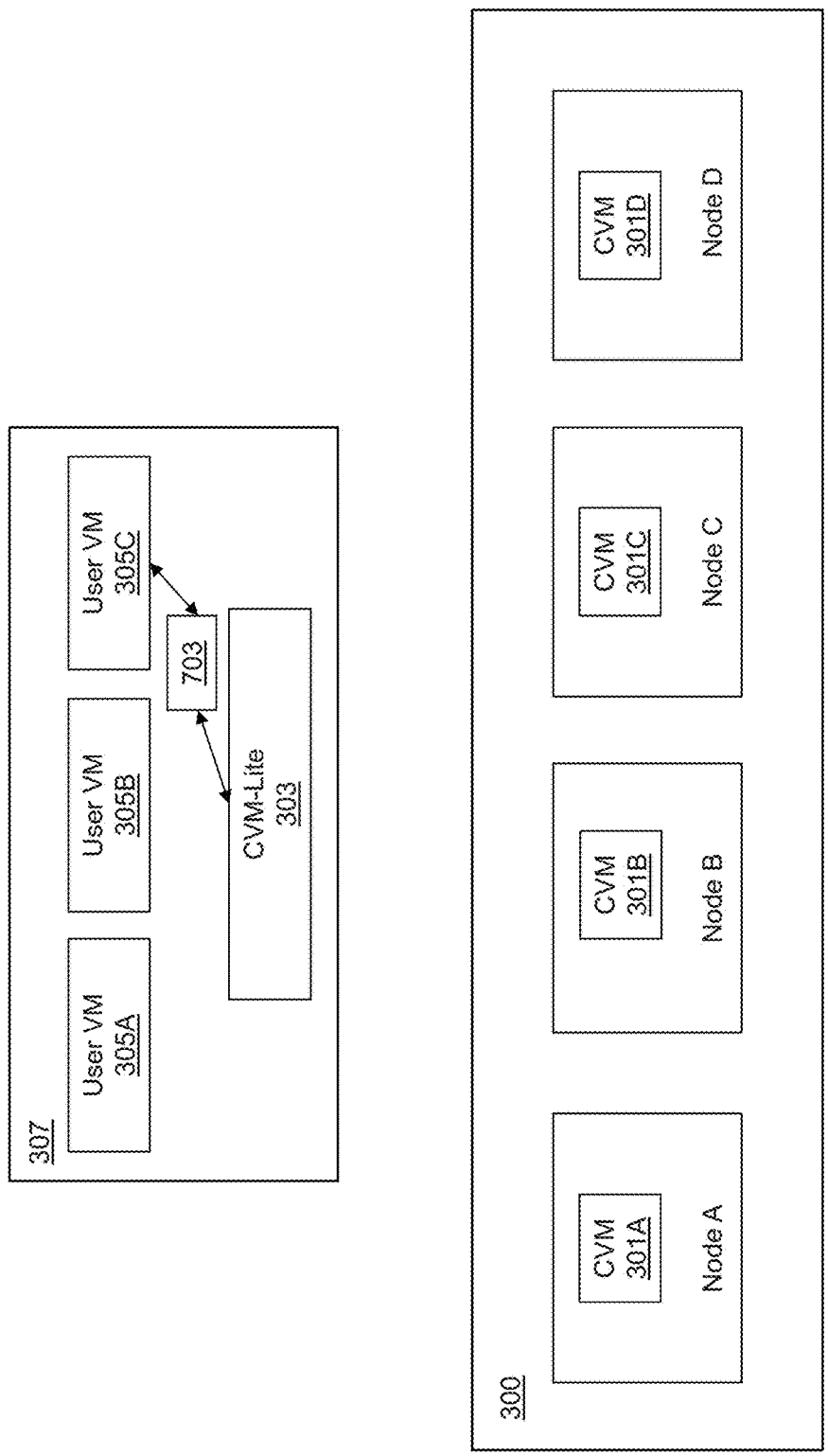

After write request 701 issued by VM 305A of the client node 703 is directed to a corresponding controller VM 301A in the clustered environment 300, another write request 703 is issued by VM 305C of the client node 307 as illustrated in FIG. 7D.

A vDisk at which the write request 703 is directed to may be identified. Again, for purposes of example, it will be assumed that the vDisk at which the write request 703 is directed is a new vDisk that is to be created for handling storage management for the VM issuing the I/O request. Because the vDisk is one that is to be created for handling storage management for the VM issuing the write request, a node (and corresponding controller VM) at the clustered environment 300 is not yet assigned to handle management of that vDisk. The controller VM lite 303 may thus dynamically identify a node A-D at the clustered environment 300 to direct the write request 700.

Figure 7E:
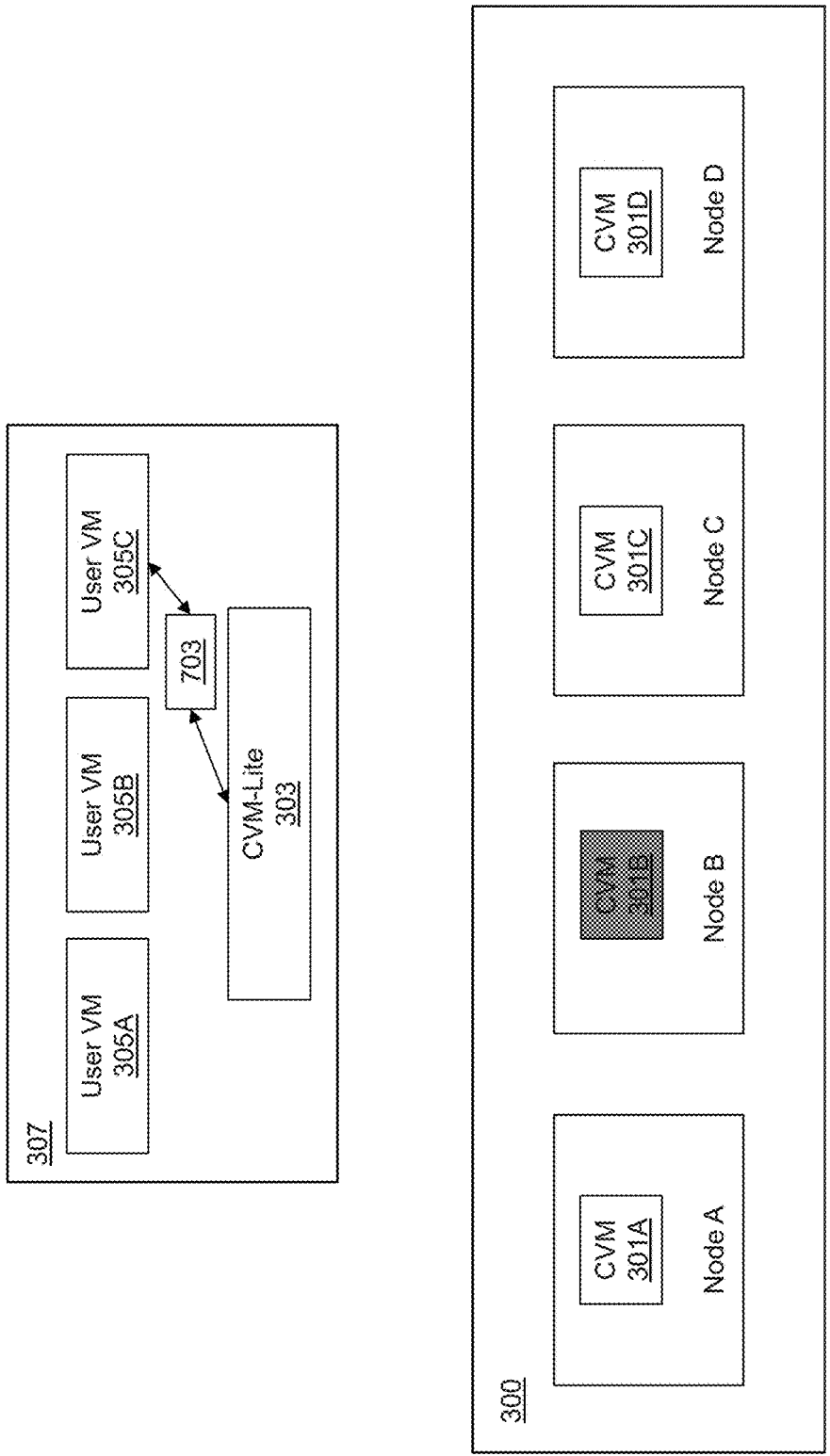
Figure 7F:
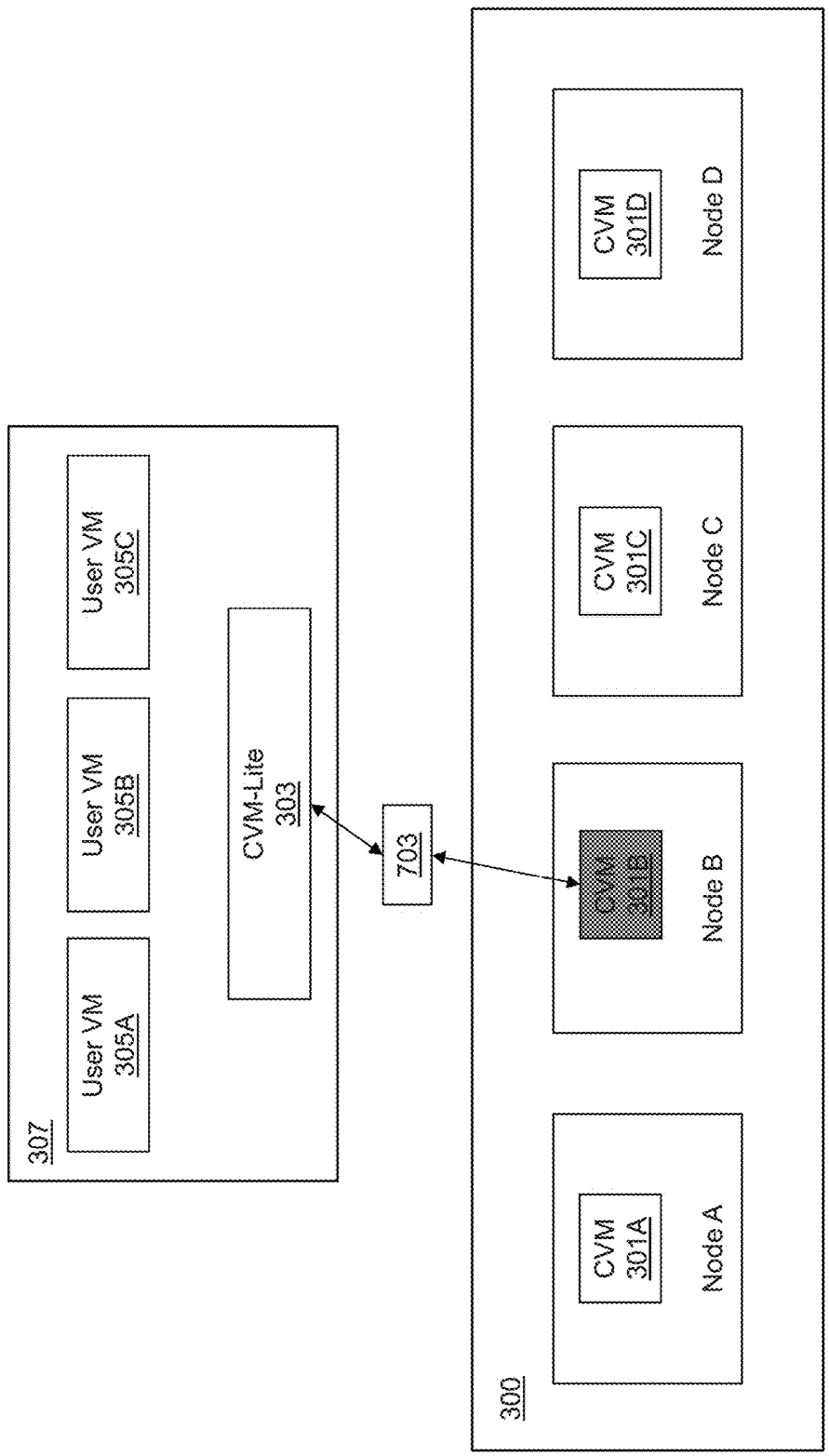

Utilizing the round robin load balancing algorithm, the CVM lite 303 at the client node 307 identifies node B in the clustered environment 300 for directing the write request 703 as illustrated in FIG. 7E. Once node B has been identified for directing the write request 703, the write request 703 is directed to the controller VM 301B corresponding to node B in the clustered environment 300 as illustrated in FIG. 7F.

Figure 7G:
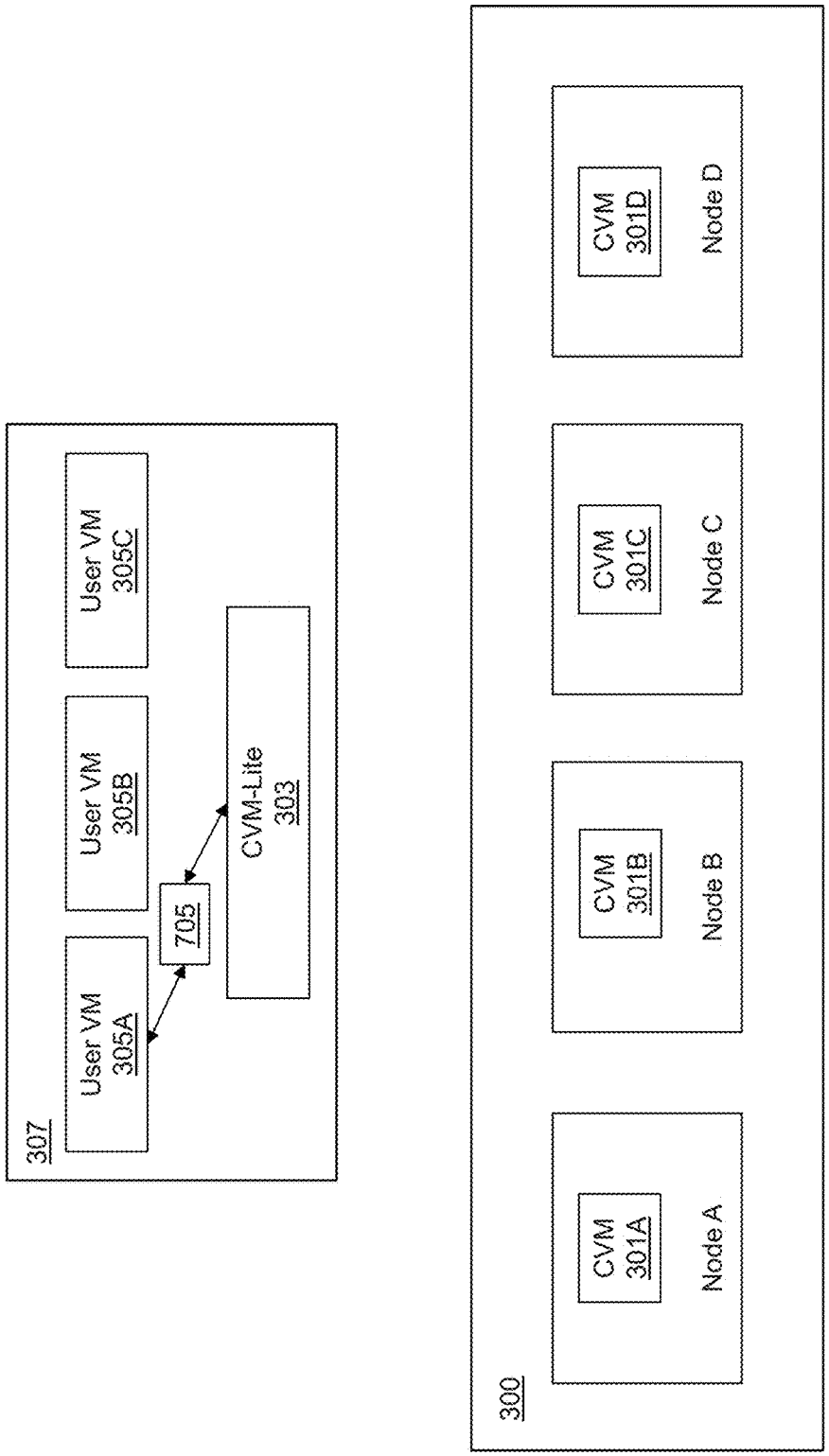
Figure 7H:
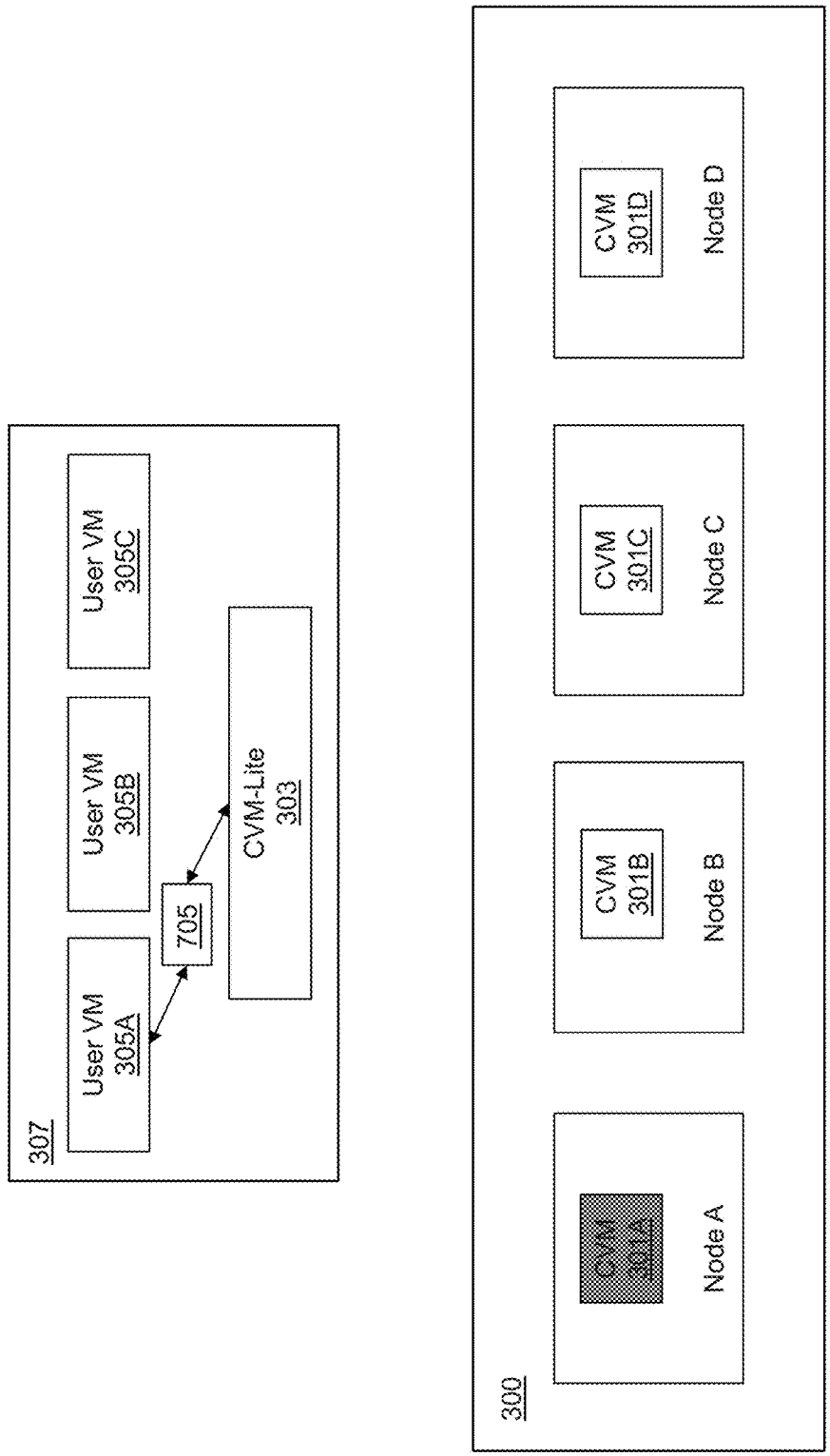

After write request 703 issued by VM 305C of the client node 703 is directed to a corresponding controller VM 301B in the clustered environment 300, a read request 705 is issued by VM 305A of the client node 307 as illustrated in FIG. 7G A vDisk at which the read request 705 is directed is then identified. The vDisk at which the read request 705 is directed has already been created to handle storage management for the VM 305A issuing the read request 705. The controller VM lite 303 identifies the node A at the clustered environment as being associated with the vDisk as illustrated in FIG. 7H. The controller VM lite 303 may make this determination by accessing its metadata to identify which node in the clustered environment 307 was previously servicing I/O requests for the VM 305A. Because node A in the clustered environment 300 was previously servicing I/O requests for VM 305A, it is identified for servicing the current read request 705.

Figure 7I:
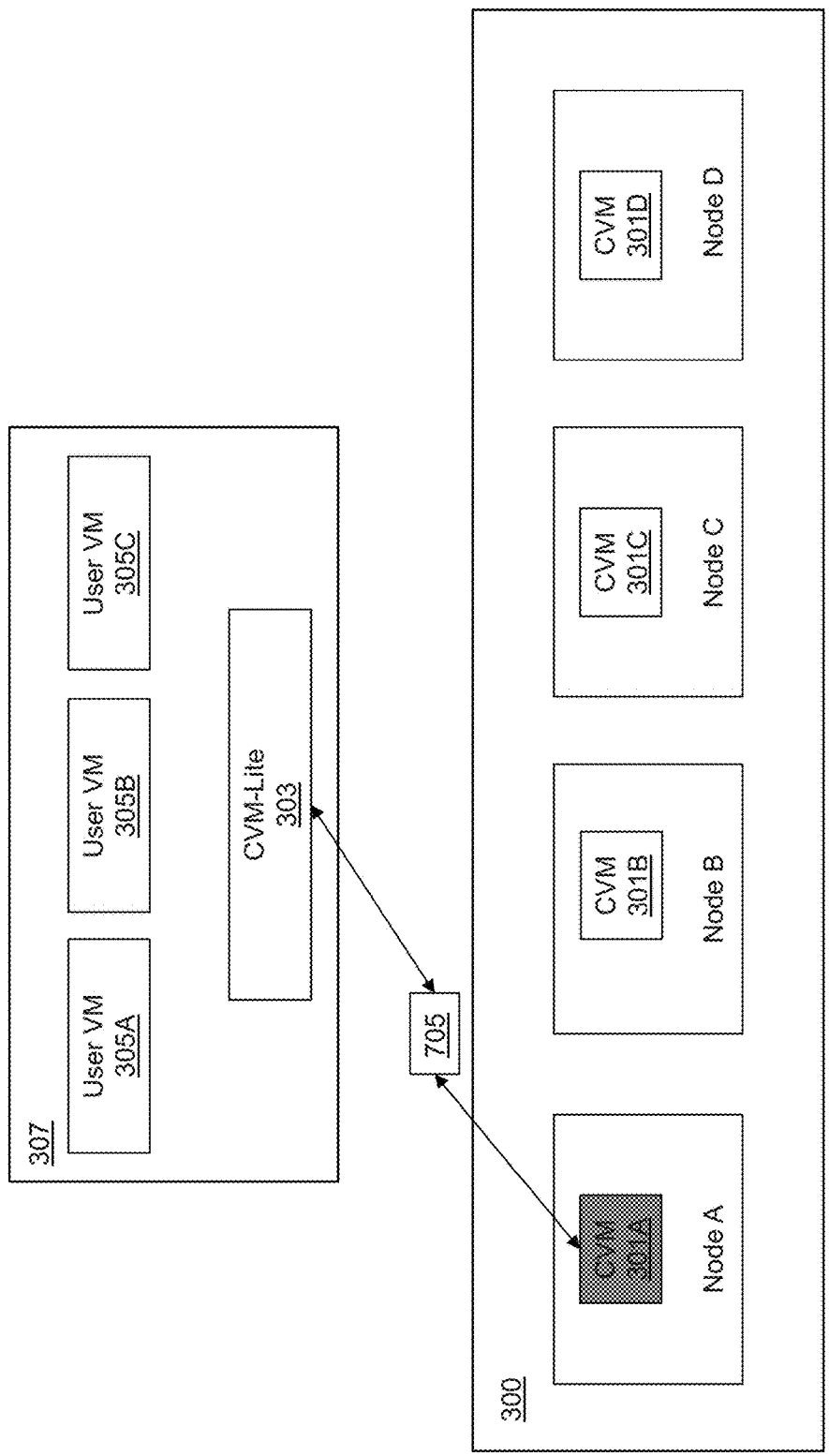

After node A is identified for directing the read request 705 issued by VM 305A, the read request 705 is transmitted by the controller VM lite 303 to the controller VM 301 residing at the node A as illustrated in FIG. 7I.

System Architecture

Figure 8:
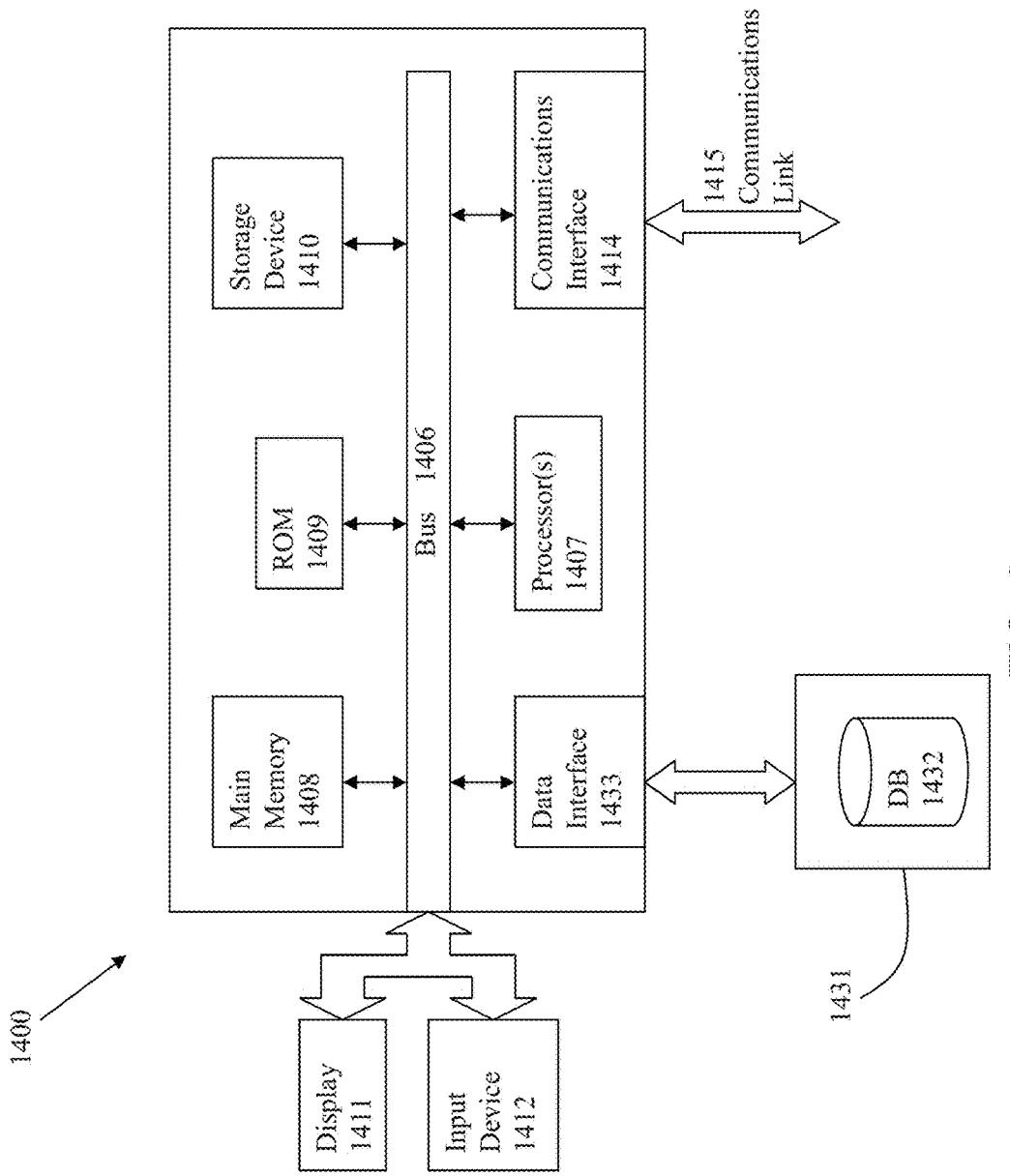
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   maintaining a first controller virtual machine and a second controller virtual machine, the first controller virtual machine located at a first node that is external to a clustered virtualization environment, the second controller virtual machine located at a second node in the clustered virtualization environment, the first controller virtual machine providing storage management by communicating with the second controller virtual machine, wherein the second controller virtual machine runs as a virtual machine on the second node, the second controller virtual machine operating with another controller virtual machine to form a storage pool;
   receiving an I/O request at the first controller virtual machine from a user virtual machine; and
   distributing, by the first controller virtual machine, the I/O request to second controller virtual machine within the clustered virtualization environment.

2. The method of claim 1, wherein the first controller virtual machine identifies a state of the clustered virtualization environment by communicating with the second controller virtual machine.

3. The method of claim 1, wherein a state of the clustered virtualization environment comprises:
   a number of active controller virtual machines in the clustered virtualization environment;
   a current load of the active controller virtual machines; and
   a health status of the active controller virtual machines.

4. The method of claim 1, wherein the first controller virtual machine maintains metadata corresponding to issued I/O requests.

5. The method of claim 1, wherein metadata identifies which controller virtual machines in the clustered virtualization environment previously handled I/O requests from the first controller virtual machine.

6. The method of claim 1, wherein metadata comprises locations of data in the clustered virtualization environment associated with previous I/O requests.

7. The method of claim 1, wherein the first controller virtual machine and the user virtual machine runs above a first hypervisor, and the second controller virtual machine runs above a second hypervisor.

8. A computer program product embodied on a non-transitory computer readable medium having stored thereon a sequence of instructions which, when executed by a processor executes a set of acts, the set of acts comprising:
   maintaining a first controller virtual machine and a second controller virtual machine, the first controller virtual machine located at a first node that is external to a clustered virtualization environment, the second controller virtual machine located at a second node in the clustered virtualization environment, the first controller virtual machine providing storage management by communicating with the second controller virtual machine, wherein the second controller virtual machine runs as a virtual machine on the second node, the second controller virtual machine operating with another controller virtual machine to form a storage pool;
   receiving an I/O request at the first controller virtual machine from a user virtual machine; and
   distributing, by the first controller virtual machine, the I/O request to second controller virtual machine within the clustered virtualization environment.

9. The computer program product of claim 8, wherein the first controller virtual machine identifies a state of the clustered virtualization environment by communicating with the second controller virtual machine.

10. The computer program product of claim 8, wherein a state of the clustered virtualization environment comprises:
    a number of active controller virtual machines in the clustered virtualization environment;
    a current load of the active controller virtual machines; and
    a health status of the active controller virtual machines.

11. The computer program product of claim 8, wherein the first controller virtual machine maintains metadata corresponding to issued I/O requests.

12. The computer program product of claim 8, wherein metadata identifies which controller virtual machines in the clustered virtualization environment previously handled I/O requests from the first controller virtual machine.

13. The computer program product of claim 8, wherein metadata comprises locations of data in the clustered virtualization environment associated with previous I/O requests.

14. The computer program product of claim 8, wherein the first controller virtual machine and the user virtual machine runs above a first hypervisor, and the second controller virtual machine runs above a second hypervisor.

15. A system, comprising:
    a memory comprising a sequence of instructions; and
    a processor that executes the sequence of instructions to perform a set of acts, the set of acts comprising:
       maintaining a first controller virtual machine and a second controller virtual machine, the first controller virtual machine located at a first node that is external to a clustered virtualization environment, the second controller virtual machine located at a second node in the clustered virtualization environment, the first controller virtual machine providing storage management by communicating with the second controller virtual machine, wherein the second controller virtual machine runs as a virtual machine on the second node, the second controller virtual machine operating with another controller virtual machine to form a storage pool;

receiving an I/O request at the first controller virtual machine from a user virtual machine; and distributing, by the first controller virtual machine, the I/O request to second controller virtual machine within the clustered virtualization environment.

16. The system of claim 15, wherein the first controller virtual machine identifies a state of the clustered virtualization environment by communicating with the second controller virtual machine.

17. The system of claim 15, wherein a state of the clustered virtualization environment comprises:

a number of active controller virtual machines in the clustered virtualization environment;

a current load of the active controller virtual machines; and a health status of the active controller virtual machines.

18. The system of claim 15, wherein the first controller virtual machine maintains metadata corresponding to issued I/O requests.

19. The system of claim 15, wherein metadata identifies which controller virtual machines in the clustered virtualization environment previously handled I/O requests from the first controller virtual machine.

20. The system of claim 15, wherein metadata comprises locations of data in the clustered virtualization environment associated with previous I/O requests.

21. The system of claim 15, wherein the first controller virtual machine and the user virtual machine runs above a first hypervisor, and the second controller virtual machine runs above a second hypervisor.

* * * * *